United States Patent [19]
Pullen, Jr.

[11] 4,063,297
[45] Dec. 13, 1977

[54] ELECTRIC ARC INTERRUPTER AND CIRCUIT BREAKER

[75] Inventor: Keats A. Pullen, Jr., Kingsville, Md.

[73] Assignee: The United States of America as represented by the Secretary of the Army, Washington, D.C.

[21] Appl. No.: 740,332

[22] Filed: Nov. 9, 1976

[51] Int. Cl.² .............................................. H02H 7/22

[52] U.S. Cl. ........................................ 361/14; 361/12; 337/273; 337/281

[58] Field of Search ....................... 361/14, 12, 10, 11, 361/2, 58; 337/110, 185, 239, 240, 238, 281, 282, 273, 274, 279, 171, 178; 200/147 R, 147 A, 144 R

[56] References Cited

U.S. PATENT DOCUMENTS 1,122,478 12/1914 Cole .................................... 337/239
2,358,676 9/1944 Wood .............................. 337/239 X
2,769,059 10/1956 Baenziger ....................... 337/239 X

*Primary Examiner*—J D Miller
*Assistant Examiner*—Patrick R. Salce
*Attorney, Agent, or Firm*—Nathan Edelberg; A. Victor Erkkila; Harold H. Card, Jr.

[57] ABSTRACT

An arc interrupter for heavy surge currents in power systems is provided in which a self-biasing, spring helix conductor is fixed between two frangible and/or fusible elements which are in turn integrally fastened to the edges of respective eddy-current rings canted to effect a horn gap for magnetic blow-out of any ensuing arc in the area of the helix. The helix generates magnetic forces in addition to its spring force to break the fusible and/or frangible elements in response to predetermined surge currents and will then drop out of the gap between the eddy-current rings by gravity action. The circuit is thus broken and any ensuing arc is extinguished.

8 Claims, 2 Drawing Figures

ELECTRIC ARC INTERRUPTER AND CIRCUIT BREAKER

RIGHTS OF THE GOVERNMENT

The invention described herein may be manufactured, used, and licensed by or for the United States Government for governmental purposes without the payment to me of any royalty thereon.

FIELD OF THE INVENTION

This invention relates to circuit breakers and more particularly to circuit breakers for power systems for interrupting surge-type arcs on such power systems.

BACKGROUND OF THE INVENTION

In power systems where heavy surge-type arcs are apt to take place it is highly desirable to have a means for interrupting the powerful surge currents and the associated ensuing arc, which means will augment the normal fuse and circuit breaker interrupter to provide a more complete and reliable means for interrupting the circuit under conditions of abnormally high surge currents.

It is an object of the present invention to provide a new and novel surge current and arc interrupter for power circuits.

It is another object of this invention to provide a new and novel surge current and arc interrupter means utilizing a combination of magnetic, frangible, and fusible elements.

These and other objects of the present invention will become more fully apparent with reference to the following specification and drawing which relate to a preferred embodiment of the invention.

SUMMARY OF THE INVENTION

The electric arc interrupter and circuit breaker of the present invention includes a helix of conductive material disposed in a portion of an electrical line defining a gap between input and output conductors and being supported in said gap area by a pair of frangible or fusible link means. Also disposed within the region of the gap and on opposed sides thereof are a pair of eddy-current rings on which the link means are mounted and which are mounted on input and output conductors to support the helix by way of the frangible or fusible links and also are canted to create a horn gap which due to magnetic effect in the eddy-current rings tend to blow out any arc which forms in the gap. The conductive helix of the present invention is disposed in axial tension which is generated within the helix itself. Thus, when the fusible links connecting the helix to the opposite ends of the gap via the eddy-current rings are caused to fuse in response to an abnormal surge current, the helix will contract and drop completely out of the gap and the remaining eddy-current rings and magnetic effects will extinguish the arc.

DETAILED DESCRIPTION OF THE DRAWINGS

Figures 1, 2:
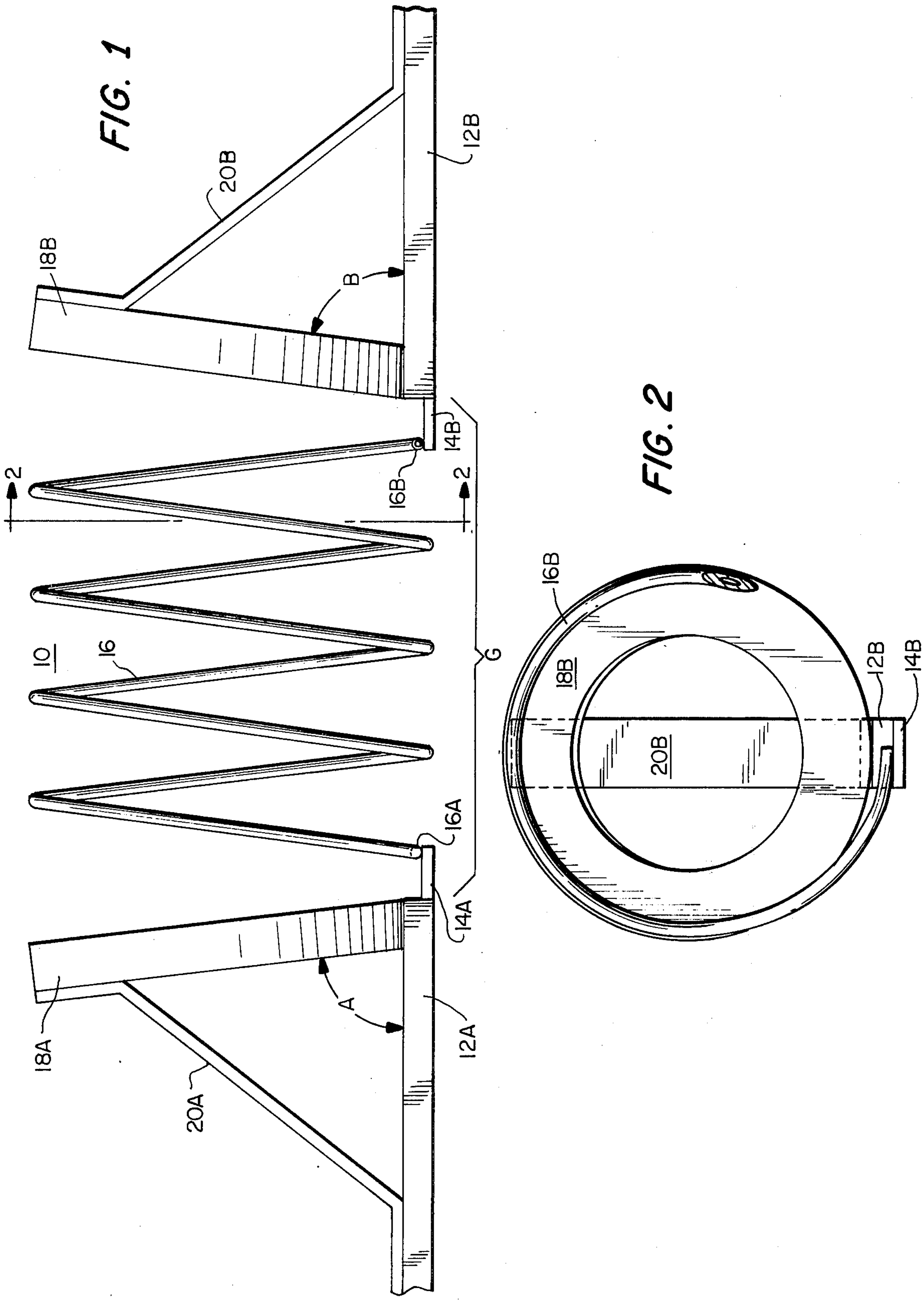
FIG. 1 is a side elevation of the circuit breaker and arc interrupter device of the present invention.
FIG. 2 is a cross section taken along line 2—2 of FIG. 1.

Referring in detail to the drawings the arc suppressor 10 of the present invention is shown as including an input conductor 12A spaced across a gap G from an output conductor 12B.

A first frangible and fusible link 14A is affixed in the gap G to the input conductor 12A and a second fusible and frangible link 14B is affixed in the gap G to the output conductor 12B. Both of the fusible and frangible links 14A and 14B are electrical conductive contact with corresponding ones of the input and output conductors 12A and 12B.

Bridging the gap between the inner most ends of the fusible and frangible links 14A and 14B is a helix 16 of conductive material, which is preferably light weight tubing, such as aluminum alloy of high inherent stiffness and which is axially tensioned between its ends 16A and 16B, the latter being respectively soldered or otherwise fused to the innermost tips of the fusible and/or frangible links 14A and 14B, respectively. The aluminum tubing comprising the helix 16 is made thick enough to carry substantially more than a normal peak expected current, for example at least 2 to 5 times expected peak current and is designed in such a way that substantial magnetic contraction forces will result from currents greatly in excess of normal peak. Thus, under abnormal conditions for which this arc suppressor and circuit breaker is designed, the magnetic forces in the helix will supplement and augment the axial bias already placed in the helix in affixing it between the fusible and/or frangible links 14A and 14B thereby cause a failure which will break the circuit at a predetermined surge current value. In immediate proximity to the opposite ends of the gap and the fusible and frangible links 14A and 14B, and in conductive relationship therewith and with the input and output conductors 12A and 12B, are a first and second eddy-current ring means 18A and 18B which are canted or offset from a vertical plane to define a horn gap as is known in the art. The plane of each eddy-current ring 18A and 18B is substantially transversely disposed with respect to the input and output conductors 12A and 12B. The eddy-current rings are canted outward away from the edtes of the gap G and are supported in that position at equal, substantially high valued acute angles A and B, respectively, by first and second respective support struts 20A and 20B. The first and second eddy-current rings 18A and 18B are rigidly supported with respect to the input and output conductors 12A and 12B, respectively, to assure that magnetic forces caused by ring eddy-currents will reenforce the compression forces generated by the magnetic field in the helix 16. Thus, the propensity of the circuit breaker and arc suppressor to self destruct upon abnormally high peak currents is further augmented by the eddy-current rings 18A and 18B.

The frangible and/or fusible links 14A and 14B are preferably made of a brittle material having moderate conductivity of sufficiently small cross section that each can be melted by currents more than 10 times the expected peak load current. The material should also have arc-suppressant properties, as is known in the art, which coupled with the magnetic forces involved under arc conditions in the circuit should blow out any arc which tends to form.

In operation, assuming a sufficiently high surge current through the input and output conductors 12A and 12B the eddy-current rings 18A and 18B, the frangible and/or fusible links 14A and 14B, and helix 16 to bring about the necessary destructive forces and phenomena in the circuit breaker and arc suppressor 10, the fusible and frangible links 14A and 14B will overheat and soften, the contractive forces in the helix 16 will tend to rupture the said links 14A and 14B and the magnetic contraction effect of the eddy-current rings 18A and 18B and in the helix 16 will ultimately cause or enhance the fracture of the said links 14A and 14B, causing the helix 16 to drop by gravity completely out of the gap G. Then, the vaporization and the arc suppressant characteristics of the materials in the fusible and frangible links 14A and 14B will tend to discourage an arc from existing across the gap G and the action of the eddy-current rings 18A and 18B being canted from the vertical so as to have a horn gap effect on the arc will further assist in suppressing and arc across the gap G.

Thus, there has been provided by the present invention a new and novel arc suppressing and circuit breaking device for augmenting normal circuit breakers and fuses in a power circuit in the advent of abnormally high surge currents, which device utilizes magnetic, gravitational, electrical and thermal forces to effectuate a breaking of the circuit and a suppression of the arc under such abnormal conditions.

It should be understood that the apparatus of the present invention may be modified as would occur to one of ordinary skill in the art without departing from the spirit and scope of the present invention.

It is claimed:

1. Means for interrupting powerful surge currents and ensuing arcs comprising:
   - input and output conductor means defining a gap therebetween;
   - fusible extension links in said gap mounted one on said input conductor means and one on said output conductor means in electrical connection therewith;
   - a conductive spring helix axially tensioned and integrally affixed between said first and second fusible links in said gap;
   - and first and second conductive eddy-current rings facing one another and mounted on said input and output conductors, respectively, immediately adjacent said fusible links.

2. The invention defined in claim 1 wherein said eddy-current rings are disposed in planes transverse to said input and output conductor means and are canted with respect to the vertical to provide a horn gap effect across the said gap between said conductor means.

3. The invention defined in claim 1 wherein the presence of surge currents in said conductor means, said eddy-current rings and said helix, of a predetermined current value generate magnetic forces in said eddy-current rings and said helix which tend to contract said helix and fracture said fusible link, the latter being subjected to thermal currents tending to fuse same by the presence of said surge currents in excess of a predetermined value.

4. The invention defined in claim 3, wherein said eddy-current rings are disposed in planes transverse to said input and output conductor means and are canted with respect to the vertical to provide a horn gap effect across the said gap between said conductor means.

5. The invention defined in claim 1, wherein said helix is comprised of conductive tubing.

6. The invention defined in claim 5, wherein said eddy-current rings are disposed in planes transverse to said input and output conductor means and are canted with respect to the vertical to provide a horn gap effect across the said gap between said conductor means.

7. The invention defined in claim 5, wherein the presence of surge currents in said conductor means, said eddy-current rings and said helix, of a predetermined current value generate magnetic forces in said eddy-current rings and said helix which tend to contract said helix and fracture said fusible link, the latter being subjected to thermal currents tending to fuse same by the presence of said surge currents in excess of a predetermined value.

8. The invention defined in claim 7, wherein said eddy-current rings are disposed in planes transverse to said input and output conductor means and are canted with respect to the vertical to provide a horn gap effect across the said gap between said conductor means.

* * * * *